US012512977B1

(12) United States Patent
Machani (10) Patent No.: US 12,512,977 B1
(45) Date of Patent: Dec. 30, 2025

(54) STATELESS ACCOUNT AUTHENTICATION PROVABLE BY CRYPTOGRAPHIC BIOMETRIC KEY

(71) Applicant: Salah Machani, Incline Village, NV (US)

(72) Inventor: Salah Machani, Incline Village, NV (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 19/256,384

(22) Filed: Jul. 1, 2025

(51) Int. Cl.
*H04L 9/08* (2006.01)

(52) U.S. Cl.
CPC .................. *H04L 9/0866* (2013.01)

(58) Field of Classification Search
CPC ...................................................... H04L 9/0866
See application file for complete search history.

(56) References Cited

U.S. PATENT DOCUMENTS

| 9,935,947 | B1 * | 4/2018 | Machani | ............. H04L 63/0861 |
| 2020/0242232 | A1 * | 7/2020 | Machani | ............. H04L 63/0884 |
| 2025/0106031 | A1 * | 3/2025 | Parthe | ....................... H04L 9/50 |

* cited by examiner

*Primary Examiner* — Sangseok Park
(74) *Attorney, Agent, or Firm* — Charles B. Lobsenz; Brian H. Buck; Potomac Law Group, PLLC (57) ABSTRACT

Provided are a method and system for recovering access to a user account following an instance of incapacity such as lockout, takeover, etc. Through development and transmission of a Persistent Unique Identifier (PUI) for the user, account recovery enrollment and ensuing recovery operations can be instituted to leverage a stable biometric key representation of a user's unstored biometric. Such a key can be formulated to be included, along with the user's PUI and a counter value, in an account recovery token that may be unlocked using the same user's biometric to grant account access.

22 Claims, 5 Drawing Sheets

STATELESS ACCOUNT AUTHENTICATION PROVABLE BY CRYPTOGRAPHIC BIOMETRIC KEY

FIELD OF THE DISCLOSURE

Disclosed embodiments relate to user authentication and account recovery according to submission of one or more user biometrics secreted from unintended revelation via cryptography coupled with absence of biometric storage.

BACKGROUND

Access by a user to her computerized account in today's society is recognized as vital for a variety of personal and professional reasons. Loss of such access as may occur in association with, for example, an account lockout (i.e., a deprivation of access due to failed login attempts due to, for instance, forgotten password causing incorrect password entry) and/or account takeover perpetrated by a cybercriminal can be devastating on many levels.

Traditional manners of authentication intended to enable a user to recover access to her account have failed to be sufficiently reliable. Such failure manifests in an inability to either thwart potential compromise or provide adequate assurance of ongoing availability. For instance, account reset vehicles such as transmitted email, security questions, and SMS code lack inherent safeguard against compromise since, as is recognized, each is vulnerable to detection. Assurance against compromise is similarly present in the case of any commonly used recovery vehicle (e.g., cloud-based credentialing, whole biometric data or template thereof) that relies upon permanent storage. In another example, account recovery can be hampered when recovery vehicles like Fast Identity Online 2 (FIDO2) passkeys and two-factor authentication (2FA) are unusable due to unavailability of the required device for which configuration and use of these vehicles depends.

Thus, as can be readily understood, it can be crucial to enable a user to access her computerized account whenever and wherever (i.e., from any device) that access is desired, and to do so reliably without opportunity for obtention of a relevant access credential.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding recovering access to a user account, including receiving user characteristics comprising one or more biometrics corresponding to the user, generating a persistent unique identifier (PUI) for the user characteristics, and generating one or more biometric references respectively corresponding to the one or more biometrics. The method and system may further include blocking subsequent access to the one or more biometrics by discarding any storage of the one or more biometrics in response to generation of the PUI and the one or more biometric references, and enrolling the user for account recovery of the user account based on a transmission of the PUI causing a generation of one or more biometric keys respectively corresponding to the one or more biometric references. The method and system may still further include generating one or more recovery tokens respectively corresponding to the one or more biometric keys, and in response to the generating one or more recovery tokens, blocking subsequent access to the one or more biometric keys by discarding the one or more biometric keys from any storage thereof. Additionally, the method and system may include generating a candidate recovery token, and restoring access to the user account in response to a matching between the one or more recovery tokens and the candidate recovery token.

DETAILED DESCRIPTION

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Fundamental to safeguarding a user's identity when attempting an account recovery is the ability to block a rogue actor's knowledge of one or more credentials used for that recovery attempt. As has been discussed above, existing manner of account recovery lays those credentials open to interpretation and deciphering (whether in the context of, for example, phishing or obtention of the credential since it has been stored statically so that the recovery process can readily access the credential for comparison). In cases where the credential is linked to sensitive personally identifiable information (PII) in a static database or otherwise discernable through a public records database, the user's identity can be learned and the potential for malevolent use is presented.

Embodiments as are discussed herein may avoid the above-discussed revelation for the user's credential. As will be appreciated from discussion of such embodiments below, avoidance of the revelation can be principally rooted in a lack of permanent storage of the biometric credential or any decipherable interpretation thereof throughout the account recovery process, including preparation for and execution thereof. Due to the absence of such storage, the discussed embodiments devise manner of representation of the credential by which (a) neither the biometric representation (herein "biometric key") and the credential themselves are subject to any form of permanent storage for account recovery, and (b) the representation cannot be inverted (i.e., reverse engineered) to reveal the credential. In particular, the representation may be paired with a persistent unique identifier (PUI) for the user and a counter so as to formulate a recovery token to which the representation is the key to satisfy matching with a similarly formed candidate token presented for comparison at a time of requested account recovery. Further, through use of the counter (or other variability such as a timestamp), re-use or replay of the recovery token may be proactively denied or blocked such that embodiments herein remove opportunity for malicious 1:1 comparison for stored biometrics as may occur in existing recovery processes. Thus, as will be understood, the representation for the credential may be obtained at different times for the user and formulated as portions (i.e., biometric keys) of two different tokens that can be compared to obtain account recovery. Through both formulation of a respective key itself and subsequent combination into a token, permanent storage of the representation as has occurred in existing account recovery computing systems to enable account recovery is unnecessary. In these ways, manner of computing itself for account recovery is improved since computing storage is reduced, unintended revelation of the user's identity via the representation is thwarted, and opportunity for account recovery from any device may be provided.

Figure 1:
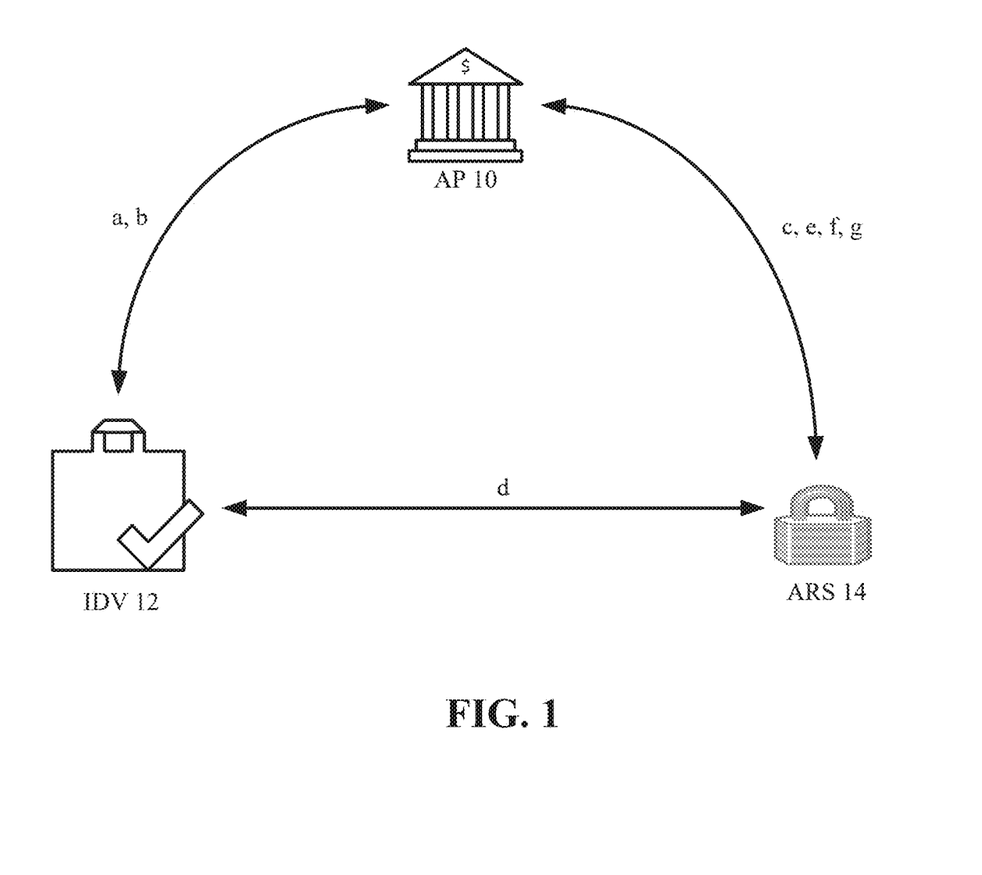
FIG. 1 illustrates an exemplary workflow for enabling user account recovery, according to embodiments herein.

Referring to FIG. 1, there is illustrated an exemplary workflow for enabling account recovery by a user. Constituent components for the workflow include an account provider (AP) 10, an identity verifier (IDV) 12, and an account recovery service (ARS) 14 which may be configured to convey and receive information therebetween according to applied encryption (e.g., TLS encryption) during transit and any period of applicable retention. In each case, the AP 10, the IDV 12, and ARS 14 may include and/or implement all appropriate software (e.g., algorithms), hardware (i.e., storage, processors) and/or software/hardware (e.g., interfaces) for communicating with each other and carrying out one or more portions of account recovery processes as are discussed herein. One or more of the AP 10, the IDV 12, and the ARS may be stand-alone or integrated therebetween and may reside on one or more physical servers. These servers may include electronic storage, one or more processors, and/or other components. The servers may also include communication lines or ports to enable the exchange of information with a network and/or other computing platforms. The servers may include a plurality of hardware, software and/or firmware components operating together to provide the functionality attributed herein according to the workflow.

Electronic storage associated with the servers may comprise non-transitory storage media that electronically stores information. The electronic storage media of electronic storage may include system storage that is provided integrally (i.e., substantially non-removable) with servers and/or removable storage that is removably connectable to the servers via, for example, a port or drive.

Electronic storage may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.) and/or other electronically readable storage media. Electronic storage may include one or more virtual storage resources (e.g., cloud storage, a virtual private network and/or other virtual storage resources). Electronic storage may store software algorithms, information determined by processors, information received from servers, information received from clients (i.e., devices not shown and in communication with one or more of AP 10, IDV 12 and/or ARS 14) and/or other information that enables the servers to function as described herein.

AP 10 may be any form of entity equipped to offer a user one or more particular types of accounts. For example, AP 10 may be a bank, an online service, a government entity, etc. IDV 12 may be an identification service (such as a service entailing one or more portions of commonly owned U.S. Pat. No. 10,956,916, entitled, "Self Learning Machine Learning Pipeline for Enabling Identity Verification," and issued Mar. 23, 2021, and/or commonly owned U.S. Patent Publication No. 2023/0230088, entitled, "Method and System of Predictive Document Verification and Machine Learning Therefor," the entire contents of each thereof being hereby incorporated by reference) initially in communication with the AP 10 to verify the user's identity. As will be understood, therefore, IDV 12 may be in communication with external data stores (not shown) that may comprise one or more external databases, data sets, systems, applications, rules bases and/or other sources of data which are used by IDV 12 to generate identity correlations as further described herein. By way of example, the external data stores may comprise credit reporting databases, public and/or private demographic databases, reported and known fraud data, financial transaction data, social media data, public licensing databases as well as other sources of data useful to IDV 12 in generating identity correlation According to the correlation, the IDV 12 may generate a PUI for the user that may, as is discussed below, represent the user's verified identity according to user-provided PII and/or biometric data supplied on an account opening request and transmitted from AP 10 to IDV 12. ARS 14 may be a dedicated account recovery service that generates representations for one or more biometrics and then uses the same to enable successful account recovery according to embodiments herein.

In these regards, FIG. 1 demonstrates, for the workflow as shown (and elaborated upon with respect to FIGS. 2-4), specific aspects of account opening, enrollment in an account recovery option offered by AP 10, and operation of account recovery techniques according to embodiments herein.

When executing the account opening, AP 10 may coordinate the collection of PII and other user-identifying information such as biometric data including an ID document image and a live selfie (collectively "user characteristics"). Following this collection, AP 10 may then transfer the user characteristics to the IDV 12 at "a." Once in possession of the user characteristics, IDV 12 may (using techniques described in the aforementioned U.S. Pat. No. 10,956,916 and/or U.S. Patent Publication No. 2023/0230088) verify the user's identity and generate a PUI. In one or more embodiments, the PUI may be configured as a universally unique identifier (UUID) or a formed hash. Once generated, the IDV 12 may transfer the PUI to AP 10 at "b." At this time, AP 10 can minimize its storage of user characteristics. For example, AP 10 may discard the user-provided biometric data (e.g., ID document image and selfie) since the PUI is now generated and can be linked to only those user characteristics (e.g., user name) that the AP 10 would normally retain for account operation. In paralleling that minimization, IDV 12 converts, immediately upon receipt from AP 10, any biometric data to a template form providing an encoding of images (and/or any other biometrics, such as voice samplings) to numerical data (hereinafter "biometric reference"). In this way, native biometric data is not permanently stored at either of the AP 10 and the IDV 12, and thus is not available to the AP 10 and IDV 12 during any subsequent part of the shown workflow. Rather, the AP 10 merely stores the information discussed above (e.g., necessary PII and the PUI) and the IDV 12 stores only the PII, the PUI generated for the user and the biometric reference.

Subsequent to (or as part of) the account opening, AP 10 may present the user an opportunity to use her biometric data to recover her account in the event of lockout, takeover, etc. (i.e., account recovery enrollment). Once the user has provided consent for such enrollment, AP 10 coordinates with ARS 14 at "c" to begin the enrollment process. Such coordination then causes ARS 14 to communicate with IDV 12 at "d" to request and receive the user's biometric reference for her biometric data so that ARS 14 may derive a biometric key from that biometric reference. Importantly to preserving the user's identity by blocking her biometric data from unnecessary transfer, each of the communications at "c" and "d" is triggered by transmission of only the PUI formulated by the IDV 12 at "b." Once ARS 14 has derived the biometric key, it discards the biometric reference and then proceeds to use that key to formulate a recovery token by which comparison to the biometric key can occur at a time of attempted account recovery (see FIGS. 3-4 and accompanying discussion below). At this time, therefore, ARS 14 stores only the PUI and recovery token, and thereafter notifies AP 10 (at "e") that enrollment of the user for account recovery is complete.

Now that the user has been enrolled for account recovery, the illustrated workflow can execute such recovery whereby at "f" AP 10 informs ARS 14, via transmission of the user's PUI, that recovery is requested. Having received and processed this request, ARS 14 can undertake the recovery process as is explained in detail with respect to FIG. 4 and its accompanying discussion. In concluding the workflow, ARS 14 may inform AP 10 at "g" of the results of the attempted account recovery.

Figure 2:
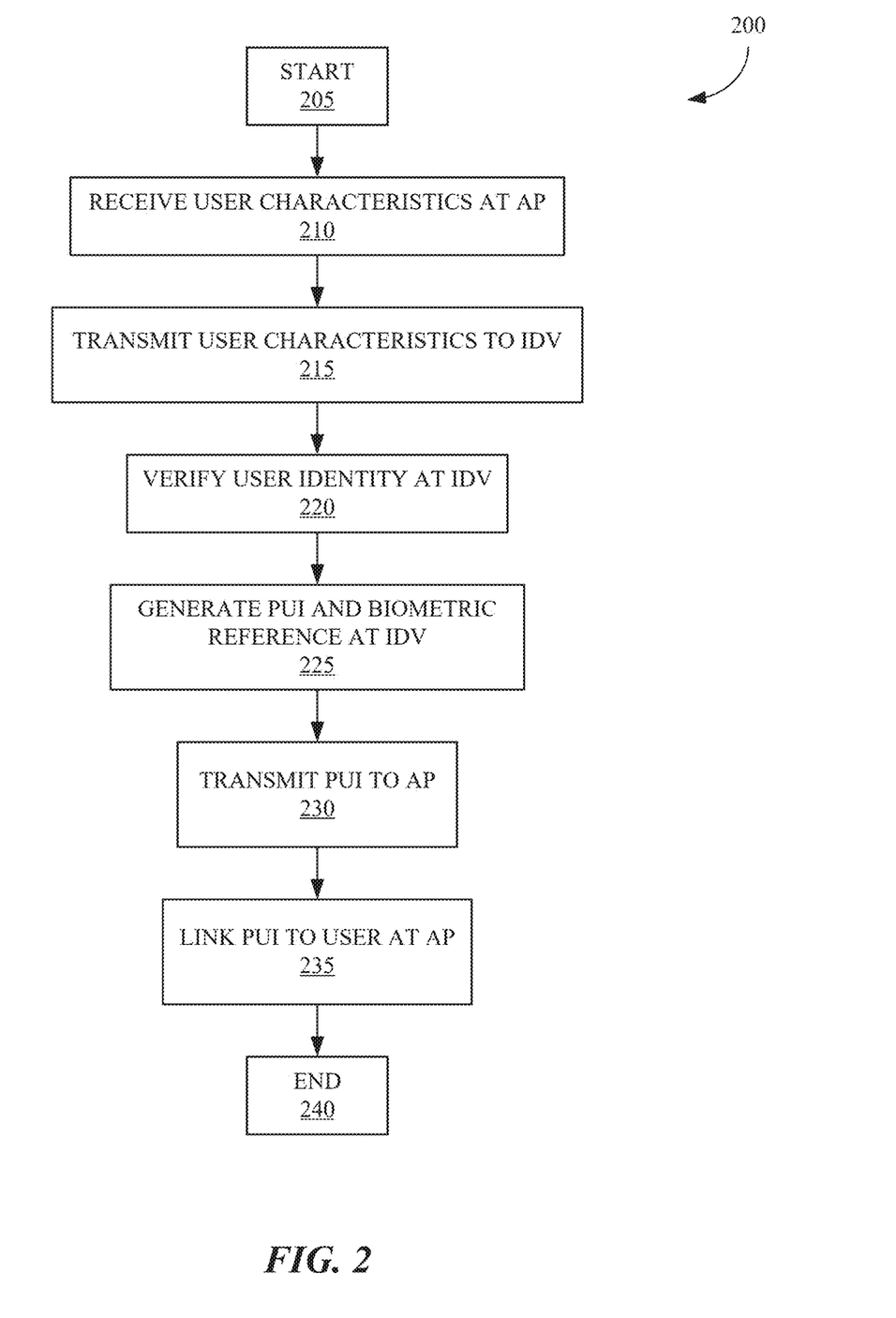
FIG. 2 illustrates a flow diagram of an account opening for which authentication, in an instance of account recovery, may be applicable, according to embodiments herein.
Figure 3:
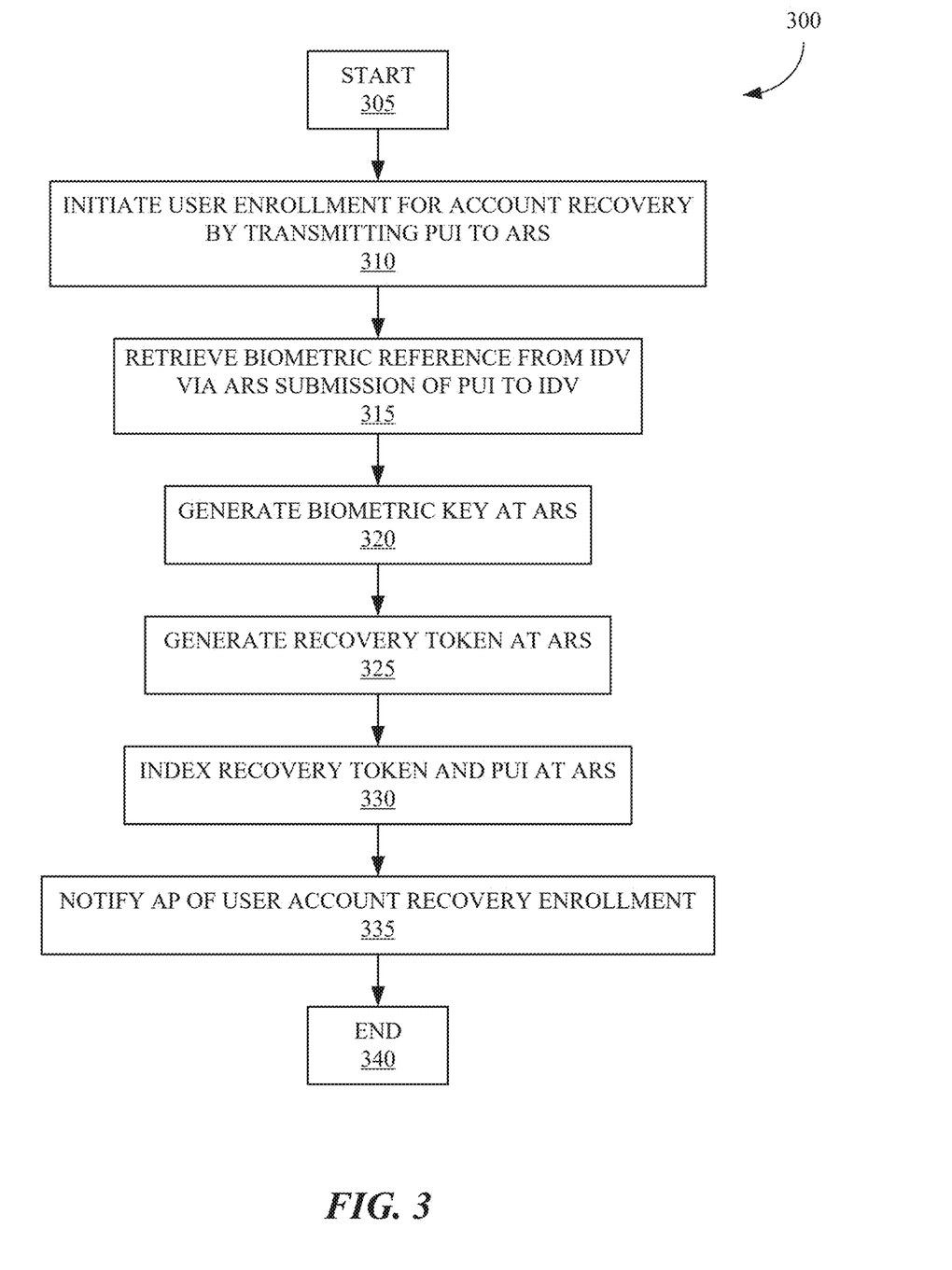
FIG. 3 illustrates a flow diagram of enrollment of a user in account recovery, according to embodiments herein.
Figure 4:
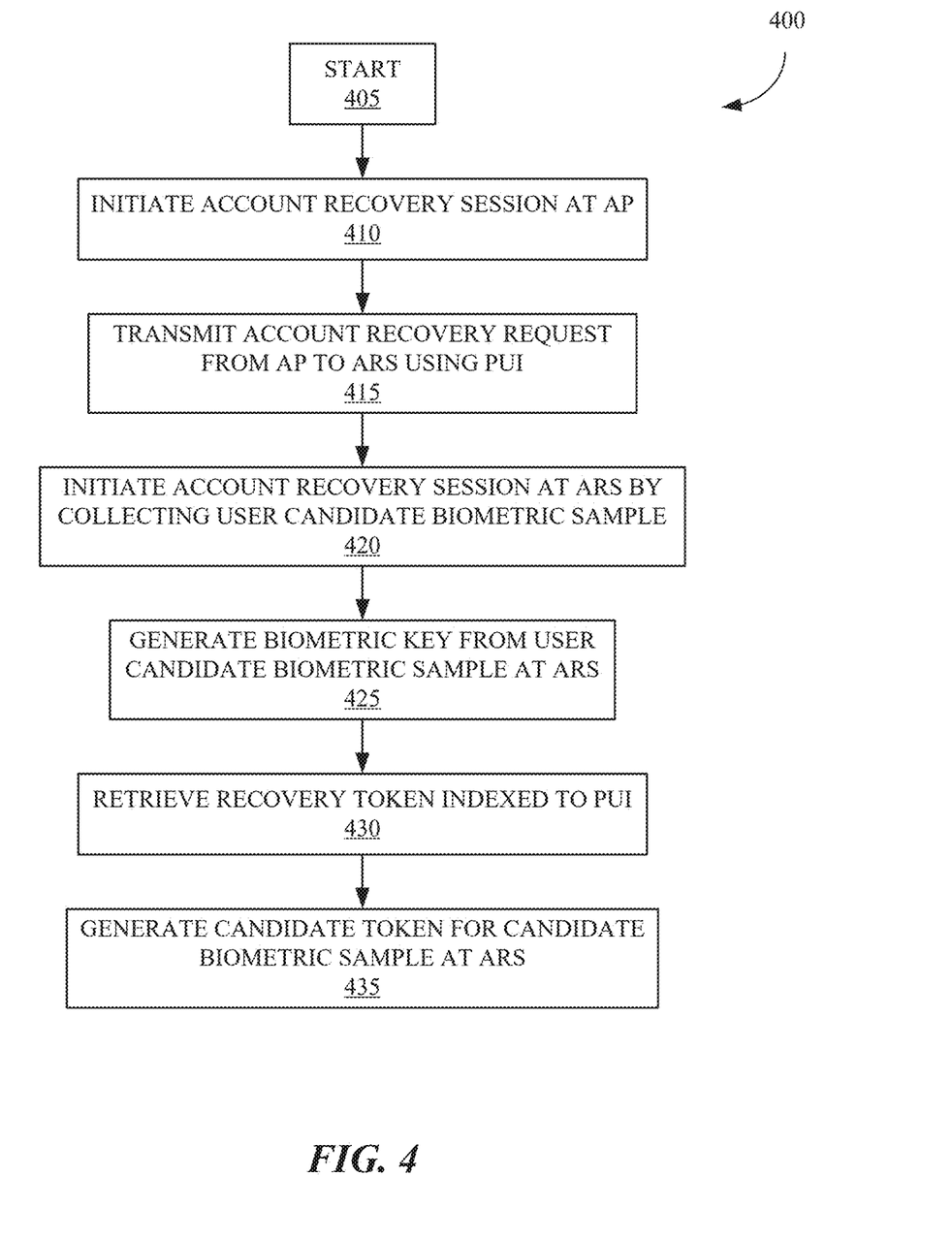
FIG. 4 illustrates a flow diagram demonstrating aspects of account recovery, according to embodiments herein.

Relative to the workflow as has been discussed above in connection with FIG. 1, the following discussion of FIGS. 2-4 further details respective aspects of, according to embodiments herein, account opening, account recovery enrollment, and account recovery operations.

Thus, in referring to FIG. 2 regarding aspects of account opening, process 200 thereof can start at 205 and proceed to receive, by AP 10, user characteristics (e.g., name, address, email address, date of birth, identification photograph and live selfie) at 210. In accordance with principles recognized under exemplary "Know Your Customer" regimes as are discussed in the above referenced U.S. Pat. No. 10,956,916, such characteristics can be transmitted to IDV 12 at 215 whereupon IDV 12 attempts to verify the user's identity (according to, for example, techniques discussed in the above-referenced U.S. Pat. No. 10,956,916 and/or U.S. Patent Publication No. 2023/0230088) at 220. Once verified, IDV 12 may then generate a PUI for the user at 225 (i.e., PUIs only being generated for verified identities), and then also generate a "biometric reference" according to the received identification photograph and live selfie such that these items may then be discarded immediately. In this way, the IDV 12 may retain the generated PUI, the received PII and biometric reference according to instituted encryption so that the IDV 12 may be able to recognize verification of the same user in the future. Having generated the PUI and biometric reference, the IDV 12 can then, at 230, transmit the PUI to the AP 10 such that the AP 10 can, at 235, link this PUI to the user for the user characteristics transmitted at 215. In this way, and prior to operations ending at 240, AP 10 can thus discard all PII and other data (e.g., imaging) except that which is necessary to conduct account operations. In this regard, it is contemplated that the identification photograph and live selfie from which the biometric reference was generated may be among the discarded data since the same would be verified as a result of transmission of the PUI from the IDV 12.

In referring to FIG. 3 detailing aspects of account recovery enrollment, process 300 can begin at 305 and thereafter proceed to enroll the user for account recovery using the biometric data provided at 210 in FIG. 2. Once consent for the enrollment is obtained from the user, process 300 can execute the enrollment at 310 whereat AP 10 transmits the user's PUI to the ARS 14. That is, mere transmission of the PUI is the trigger for biometric account recovery enrollment. In response to this trigger, ARS 14 transmits the PUI to the IDV 12, at 315, as the authorization for the ARS 14 to receive, from the IDV 12, the user's biometric reference according to that PUI. Upon receipt of the reference, the ARS 14 proceeds, at 320, to generate a biometric key serving as a cryptographic representation of the reference. In one or more embodiments, such a biometric key can be generated according to fuzzy extraction on the biometric reference itself (i.e., any storage of helper data contributing to subsequent key reproduction is omitted). Alternatively, the key may be generated according to encoding by a machine learning model for the biometric reference (e.g., by producing appropriate embeddings which are then hashed). In either case, it is contemplated that both manners of biometric key generation may produce a key of high entropy (e.g., 128 or 256 bit) such that it could not be inverted to obtain either the biometric reference or the underlying biometric thereof. In this way, the biometric reference and underlying biometric are blocked from any opportunity for malicious obtention presented by required storage and transfer of biometric information undertaken by currently existing account recovery processes. Further, such biometric reference is immediately discarded at the ARS 14 once the biometric key is generated so as to provide further blocking of opportunity for malevolent use of any biometric information in any regard.

With this biometric key, process 300 can then proceed to 325 whereat ARS 14 is equipped to generate a recovery token for which, in a process of account recovery as is discussed below with reference to FIG. 4, the generated biometric key is the instrument to unlock that recovery token in order to permit an account to be recovered. In one or more embodiments, ARS 14 may formulate the recovery token, using a pseudo-random function (PRF) (e.g., HMAC or Hash-Based Message Authentication Code), as a combination of the user's PUI, biometric key, and a counter value. In this way, the recovery token is unique to the user via incorporation of the PUI and would be distinguished from any other user identity capable of sharing a same biometric key (e.g., as may be the case for identical twins). Once the recovery token is formulated, process 300 may cause the ARS 14 to immediately cancel future use of the biometric key itself by discarding the key at the ARS 14. Thereafter, the ARS 14 may index (i.e., store and correlate), at 330, the recovery token to the included PUI and counter value. As such, each of the recovery token, PUI, and counter value may be stored separately in encrypted form by the ARS 14. Once storage is complete, ARS 14 may then proceed, at 335 and prior to operations ending at 340, to notify AP 10 of successful enrollment of the user for account recovery.

Now that account recovery is readied for use at the AP 10, the user may be provided the ability to recover her account in the event of, for instance, a lockout occasioned by incorrect multiple entry of a pertinent password. As will be understood, and when referring to FIG. 4 providing aspects of account recovery operations according to embodiments herein, a process 400 can begin at 405 and proceed to an invitation by AP 10 to the user to furnish her account identifier (e.g., username, email, etc.) at 410. When furnished, AP 10 transmits, at 415, an account recovery request to ARS 14 including the corresponding PUI that ARS 14 can then use to conduct subsequent account recovery operations as are discussed hereinafter. In particular, such operations may include, at 420, initiation of an account recovery session via collection of a "candidate" biometric sample from the user. In this regard, the collection can be implemented by the AP 10, via coordination with the ARS 14 (e.g., the AP 10 displaying a QR code on the user device enabling capture and transfer of a live user selfie to the ARS 14, or, integrated SDK at the user device enabling transfer of a selfie to the ARS 14). As may be understood, the aforementioned discussion contemplates focus on a biometric derived from a selfie of the user, though any other type of biometric may be collected, whereas such biometric would align with the type of biometric represented in the recovery token held by the ARS 14. In other words, coordination between the AP 10 and ARS 14 enables the same type of biometric(s) to be obtained from the user at this stage as was collected at 210 in FIG. 2. This may be accomplished via operation of the ARS 14 itself or instruction by the ARS 14 to the AP 10 since the ARS 14 knows the type of and how the biometric underlying its stored recovery token ought to be compared for a like candidate biometric sample. Further, if the sample for the recovery token was obtained via fuzzy extraction on or encoding for a selfie, the same can be the case for the candidate sample. As such, the process 400 can proceed to, at 425, similarly generate a candidate biometric key for the obtained candidate biometric sample obtained at 420, after which the ARS 14 discards the candidate sample so as to block any opportunity for obtention thereof.

In recalling that the account recovery request is linked to the user's PUI (as discussed at 415), the ARS 14 may then proceed to, at 430, retrieve the indexed recovery token from its storage so that a candidate token, for comparison, may be generated at 435 by the ARS 14. In this regard, ARS 14 may configure the candidate HMAC token to include the generated candidate biometric key (generated in a same manner as the recovery token), the PUI and the same counter value computed for the recovery token. In an alternative embodiment, the candidate HMAC token may be generated by a client (i.e., user) device similarly equipped to generate tokens as the ARS 14. That is, the invitation by the AP 10 to the user at 410 discussed above can further include instruction for the user to collect a biometric using the user's device. As a result of the collection, the user's device can then generate a candidate recovery token and transmit the same (upon generation) to the ARS 14 as part of the recovery process. This way, the user's biometric is retained on the user's device. As such, the ARS 14 can then undertake to, at 440, compare the indexed recovery token to the generated candidate token to evaluate potential for account recovery according to expectation of matching for the user's biometric (i.e., an expectation that the candidate biometric will unlock the recovery token). In the event that matching is obtained, ARS 14 may notify AP 10 to grant (i.e., allow) the user access to her account (see 445); otherwise, ARS 14 may notify AP 10 of the failed matching such that pertinent actions of process 400 may be repeated, beginning with action 410, to rule out instability (e.g., poor lighting impacting adequacy of selfie capture leading to flawed key derivation) for the candidate biometric key being the cause of the failure. Following such notification(s), the recovery token is, prior to operations ending at 455, updated by ARS 14 at 450 to include an incremented counter value (i.e., +1) so as to forestall (i.e., block or deny) malicious attempt for account recovery using the originally formulated recovery token (i.e., malicious replay).

Thus, as will be understood from the above discussion, embodiments disclosed herein provide for significant improvements in computing ability to achieve account recovery. This is principally achieved by lack of any permanent storage of any raw biometric in any database associated with the workflow of FIG. 1. Because of this absence of storage, the manner of computing described herein can inherently forego direct storage of raw biometrics, and thus also currently required comparison for stored biometrics that might enable account recovery and otherwise expose a user to identity theft should their biometric be obtained by a malicious actor. That is, embodiments as are described herein implement comparison, not between raw biometrics of a same user but among tokens (i.e., recovery and candidate) formulated for biometric keys derived from biometric references by which the keys and references are immediately discarded by the ARS 14 upon token generation. In these ways, a user's biometric may be dually shielded from unintended obtention through (a) a first shielding offered by the discussed biometric key formulation according to high-entropy, non-invertible fuzzy extraction or ML model production and (b) incorporation of the biometric key as part of a HMAC token, and associated discarding of that key once the token is generated. At the same time, storage of raw biometrics is avoided by the present embodiments since account recovery is enabled by matching between a designated recovery token and a candidate recovery token. In particular, each token must (for successful recovery) incorporate a user's same representative biometric key (which, according to the embodiments herein, satisfies industry standards for revocability (through requested token deletion) and non-recoverability) for their initially collected biometric. Computing for account recovery, according to embodiments herein, is further enhanced relative to existing systems since at no time does any of the AP 10, IDV 12 or the ARS 14 permanently retain a user's raw biometric once the user's PUI is created. In this way, the PUI—not any of the user's raw biometric or representation thereof—may serve as the trigger for initiating account enrollment and account recovery. As will be appreciated, use of the PUI in this manner to achieve computing enabling account recovery bypasses currently existing need to submit and compare a user's biometric during interactions between existing system components.

In regard to the above-discussed embodiments, various modifications may be implemented.

For instance, the machine learning model that may implement obtention of the biometric key used to formulate the recovery token may include a model which is trained using supervised learning. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats. For instance, such a model may be trained to minimize differences in its output for photographs of a same person (e.g., that may vary, for instance, due to changing hairstyle, eyewear, makeup, etc.), while accentuating differences when processing photographs of other individuals. In this way, the model may be trained to produce a stable key (i.e., a key for which same information may be reproduced) through focus on stable features (e.g., facial structure, length and width of digits) of the individual being assessed for the recovery token processing.

Further, though the discussed recovery token has been formulated using a single biometric, such token may be implemented to account for multiple biometrics (e.g., facial, digital) so that an alternative biometric may be available (e.g., in the event of injury) during account recovery. As such, the user may be prompted for the multiple biometric entries by the AP 10 during a course of process 200. In this way, any type of disability for use of a given biometric may not forestall recovery efforts as resort may be had to another enrolled biometric (for which formulation of the respective biometric key and recovery token would have already occurred).

Still further, each recovery token may be temporally limited in its availability (e.g., by association with a "countdown") so that theft of the token may be additionally safeguarded. In other words, upon expiration of the countdown, the token may be incremented and may be available for use cyclically with respect to the countdown.

Additionally, embodiments herein contemplate layered security when undertaking account recovery such that the recovery process may be enabled not only by use of the recovery token and its represented biometric, but may account for secondary submission of another user-known credential. For instance, the credential may comprise a user-devised PIN, an identifier (e.g., MAC address) for, for example, a device that captured user characteristics according to process 200, or other closely-held user information.

With or without one or more of the aforementioned modifications, there is provided a stateless configuration for a recovery token enabling account recovery such that both privacy and fluidity of access are achieved. This is particularly the case as the recovery token may be proven (i.e., unlocked as) an authentic recovery vehicle via validation according to the user's biometric key at a time of attempted recovery.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of recovering access to a user account, the method comprising:
   receiving user characteristics comprising one or more biometrics corresponding to the user;
   generating a persistent unique identifier (PUI) for the user characteristics;
   generating one or more biometric references respectively corresponding to the one or more biometrics;
   blocking subsequent access to the one or more biometrics by discarding any storage of the one or more biometrics in response to the generation of the PUI and the one or more biometric references;
   enrolling the user for account recovery of the user account based on a transmission of the PUI causing a generation of one or more biometric keys respectively corresponding to the one or more biometric references;
   generating one or more recovery tokens respectively corresponding to the one or more biometric keys,
   in response to the generating one or more recovery tokens, blocking subsequent access to the one or more biometric keys by discarding the one or more biometric keys from any storage thereof;
   generating a candidate recovery token; and
   granting access to the user account in response to a matching between the one or more recovery tokens and the candidate recovery token.

2. The method of claim 1, wherein:
   the one or more biometric references each comprise a numerical representation of a respective biometric of the user.

3. The method of claim 1, wherein:
   the one or more biometric keys are generated according to either fuzzy extraction or application of a machine learning model on the respective one or more biometric references.

4. The method of claim 1, wherein:
   the one or more recovery tokens each comprises the PUI and a respective one of the one or more biometric keys respectively corresponding to the one or more biometric references.

5. The method of claim 4, wherein:
   the one or more recovery tokens each comprises a counter value.

6. The method of claim 5, wherein:
   the one or more recovery tokens each comprise the PUI and the counter value.

7. The method of claim 6, wherein:
   the candidate recovery token comprises a candidate biometric key based on a candidate biometric reference corresponding to a candidate biometric received from the user at a time other than receipt of the one or more biometrics.

8. The method of claim 7, wherein:
   each of the one or more biometric keys is generated according to either fuzzy extraction or application of a machine learning model on the respective one or more biometric references, and the candidate biometric key is generated to align with generation of the one or more biometric keys according to a same fuzzy extraction or application of a machine learning model on the candidate biometric reference corresponding to the candidate biometric.

9. The method of claim 8, wherein:
the candidate recovery token comprises the PUI and the counter value.

10. The method of claim 9, wherein:
in response to the recovery token and the candidate recovery token matching, the recovery token is updated to replace the counter value with a different counter value.

11. The method of claim 1, wherein:
the one or more recovery tokens are generated at an account recovery service or at a user device of the user.

12. A computing system for recovering access to a user account, the computing system comprising:
one or more processors; and
one or more memories storing instructions that, when executed by the one or more processors, cause the computing system to perform a process comprising:
receiving user characteristics comprising one or more biometrics corresponding to the user;
generating a persistent unique identifier (PUI) for the user characteristics;
generating one or more biometric references respectively corresponding to the one or more biometrics;
blocking subsequent access to the one or more biometrics by discarding any storage of the one or more biometrics in response to the generation of the PUI and the one or more biometric references;
enrolling the user for account recovery of the user account based on a transmission of the PUI causing a generation of one or more biometric keys respectively corresponding to the one or more biometric references;
generating one or more recovery tokens respectively corresponding to the one or more biometric keys,
in response to the generating one or more recovery tokens, blocking subsequent access to the one or more biometric keys by discarding the one or more biometric keys from any storage thereof;
generating a candidate recovery token; and
granting access to the user account in response to a matching between the one or more recovery tokens and the candidate recovery token.

13. The computing system of claim 12, wherein:
the one or more biometric references each comprise a numerical representation of a respective biometric of the user.

14. The computing system of claim 12, wherein:
the process further comprises generating the one or more biometric keys according to either fuzzy extraction or application of a machine learning model on the respective one or more biometric references.

15. The computing system of claim 12, wherein:
the one or more recovery tokens each comprises the PUI and a respective one of the one or more biometric keys respectively corresponding to the one or more biometric references.

16. The computing system of claim 15, wherein:
the one or more recovery tokens each comprises a counter value.

17. The computing system of claim 16, wherein:
the one or more recovery tokens each comprise the PUI and the counter value.

18. The computing system of claim 17, wherein:
the candidate recovery token comprises a candidate biometric key based on a candidate biometric reference corresponding to a candidate biometric received from the user at a time other than receipt of the one or more biometrics.

19. The computing system of claim 18, wherein:
the process further comprises generating each of the one or more biometric keys according to either fuzzy extraction or application of a machine learning model on the respective one or more biometric references, and generating the candidate biometric key to align with generation of the one or more biometric keys according to a same fuzzy extraction or application of a machine learning model on the candidate biometric reference corresponding to the candidate biometric.

20. The computing system of claim 19, wherein:
the candidate recovery token comprises the PUI and the counter value.

21. The computing system of claim 20, wherein:
the process further comprises, in response to the recovery token and the candidate recovery token matching, updating the recovery token to replace the counter value with a different counter value.

22. The computing system of claim 12, wherein:
the one or more recovery tokens are generated at an account recovery service or at a user device of the user.

* * * * *